United States Patent [19]

Obler

[11] 4,210,278

[45] Jul. 1, 1980

[54] APPARATUS FOR SUPPLYING CONDITIONED AIR AT A SUBSTANTIALLY CONSTANT TEMPERATURE AND HUMIDITY

[75] Inventor: Henry D. Obler, Lanham, Md.

[73] Assignee: The United States of America as represented by the Administrator of the National Aeronautics and Space Administration, Washington, D.C.

[21] Appl. No.: 9,886

[22] Filed: Feb. 6, 1979

[51] Int. Cl.² .............................................. F24F 13/04
[52] U.S. Cl. ......................................... 236/49; 236/13; 236/44 C; 165/16
[58] Field of Search ....................... 165/16; 236/13, 49, 236/44 C

[56] References Cited

U.S. PATENT DOCUMENTS

| | | | |
|---|---|---|---|
| 1,909,164 | 5/1933 | Bulkeley | 236/49 X |
| 2,338,382 | 1/1944 | Marlow | 165/16 X |
| 2,407,036 | 9/1946 | Snavely | 236/49 X |
| 2,813,235 | 11/1957 | Clay | 236/13 X |
| 4,044,947 | 8/1977 | Spethmann | 165/16 X |
| 4,102,494 | 7/1978 | Coleman et al. | 236/13 X |
| 4,136,732 | 1/1979 | Demaray et al. | 165/16 |

Primary Examiner—Albert J. Makay
Assistant Examiner—William E. Tapolcai, Jr.
Attorney, Agent, or Firm—Robert D. Marchant; John R. Manning; John O. Tresansky

[57] ABSTRACT

An apparatus for supplying conditioned air at a substantially constant temperature and humidity. The apparatus includes a supply duct coupled to a source of supply air for carrying the supply air therethrough. A return duct is coupled to the supply duct for carrying return conditioned air therethrough. A temperature reducing device is coupled to the supply duct for decreasing the temperature of the supply and return conditioned air. A by-pass duct is coupled to the supply duct for selectively directing portions of the supply and return conditioned air around the temperature reducing device. Another by-pass duct is coupled to the return duct for selectively directing portions of the return conditioned air around the supply duct and the temperature reducing device. Controller devices selectively control the flow and amount of mixing of the supply and return conditioned air flowing through the temperature reducing device and within the supply duct, the return duct, the by-pass duct and the another by-pass duct whereby the temperature and humidity of the conditioned air is maintained substantially constant. A circulating mechanism moves the supply air, the return conditioned air, and the conditioned air through the supply duct, the return duct, the by-pass duct, and the another by-pass duct.

15 Claims, 2 Drawing Figures

APPARATUS FOR SUPPLYING CONDITIONED AIR AT A SUBSTANTIALLY CONSTANT TEMPERATURE AND HUMIDITY

ORIGIN OF THE INVENTION

The invention described herein was made by an employee of the United States Government and may be used by or for the Government for governmental purposes without the payment of any royalties thereon or therefor.

BRIEF SUMMARY OF THE INVENTION

This invention relates generally to air conditioning devices and more particularly to an apparatus for supplying conditioned air at a substantially constant temperature and humidity.

Air conditioning units and, in particular, air conditioning units that supply conditioned air to environmentally controlled areas are well known. When supplying conditioned air to environmentally controlled areas such as rooms that contain sensitive electronic hardware, computers, and the like, it is highly desirable to supply the conditioned air at a substantially constant temperature and humidity. Should the temperature and humidity fluctuate, the electronic hardware could be damaged by too low or high a temperature and by a high humidity level.

Various techniques have been used to control the temperature and humidity of conditioned air. When using a conventional air conditioning unit that cools a supply of air, the humidity of the conditioned air may be too great which may damage any sensitive equipment. In addition, the supply of air may be overly cooled to condense water out of the air to reduce the humidity causing the temperature to be to low for the sensitive equipment and additional energy is needed to overcool the air which is highly uneconomical. A further disadvantage which is apparent in a direct expansion system is that the compressor could be under partial load conditions which causes it to shut off at different intervals creating fluctuations in the temperature of the conditioned air. When the temperature fluctuates it causes pulsations in the temperature and humidity especially when using outside air as the supply air.

To counteract some of the problems associated with the conventional air conditioning unit, other prior art devices overly cool the supply air to decrease the amount of moisture in the air and then reheat the overly cooled air to bring the conditioned air back up to the desired temperature. The disadvantage of using such a technique is that a considerable amount of energy is needed to overcool the supply air and then expensive equipment and more energy is expended to reheat the overly cooled air. Such a system is highly uneconomical.

In other prior art devices some of the energy expended for cooling and reheating is reduced by using outside air as the supply air during the economizer cycle. During this cycle outside air is used when the temperature and humidity are at the desired levels. However, when the outside air is overly humid or hot then the outside air must again be overly cooled to decrease the humidity and then reheated by expensive equipment to bring the air up to the desired temperature. Again energy is wasted in overcooling and reheating the air.

In still other prior art devices some of the supply outside air is mixed with inside return air before the cooling and heating sections to somewhat decrease the humidity which requires less cooling and reheating. This system is still uneconomical because both cooling and reheating are needed.

Accordingly, one object of the invention is to provide a new apparatus for supplying conditioned air at a substantially constant temperature and humidity.

Another object of this invention is to provide an economical apparatus for supplying conditioned air at a substantially constant temperature and humidity.

Still another object of this invention is to provide an apparatus for supplying conditioned air at a substantially constant temperature and humidity that uses relatively less energy.

A further object of this invention is to provide an apparatus for supplying conditioned air at a substantially constant temperature and humidity that does not use energy for reheat.

A still further object of this invention is to provide an apparatus for supplying conditioned air at a substantially constant temperature and humidity using outside air whenever the total outside air enthalpy is less than the return conditioned air enthalpy.

Another object of this invention is to provide an apparatus for supplying conditioned air at a substantially constant temperature and humidity that is relatively simple and inexpensive.

Briefly, these and other objects are obtained by providing an apparatus for supplying conditioned air at a substantially constant temperature and humidity having a supply duct coupled to a source of supply air for carrying the supply air therethrough. A return duct is coupled to the supply duct for carrying return conditioned air therethrough. A temperature reducing device is coupled to the supply duct for decreasing the temperature of the supply and return conditioned air. A by-pass duct is coupled to the supply duct for selectively directing portions of the supply and the return conditioned air around the temperature reducing device. Another by-pass duct is coupled to the return duct for selectively directing portions of the return conditioned air around the supply duct and the temperature reducing device. Controller devices selectively control the amount of flow and mixing of the supply and return conditioned air flowing through the temperature reducing device and within the supply duct, the return duct, the by-pass duct and the another by-pass duct, whereby the temperature and humidity of the conditioned air is maintained substantially constant. A circulating mechanism within the supply duct moves the supply air, the return conditioned air, and the conditioned air through the supply duct, the return duct, the by-pass duct, and the another by-pass duct.

The above and further objects of the invention will be more fully apparent from the following detailed description when read in conjunction with the accompanying drawings.

BRIEF DESCRIPTION OF THE DRAWINGS

In the drawings where like parts are designated by the same references.

DESCRIPTION OF THE PREFERRED EMBODIMENT

Figure 1:
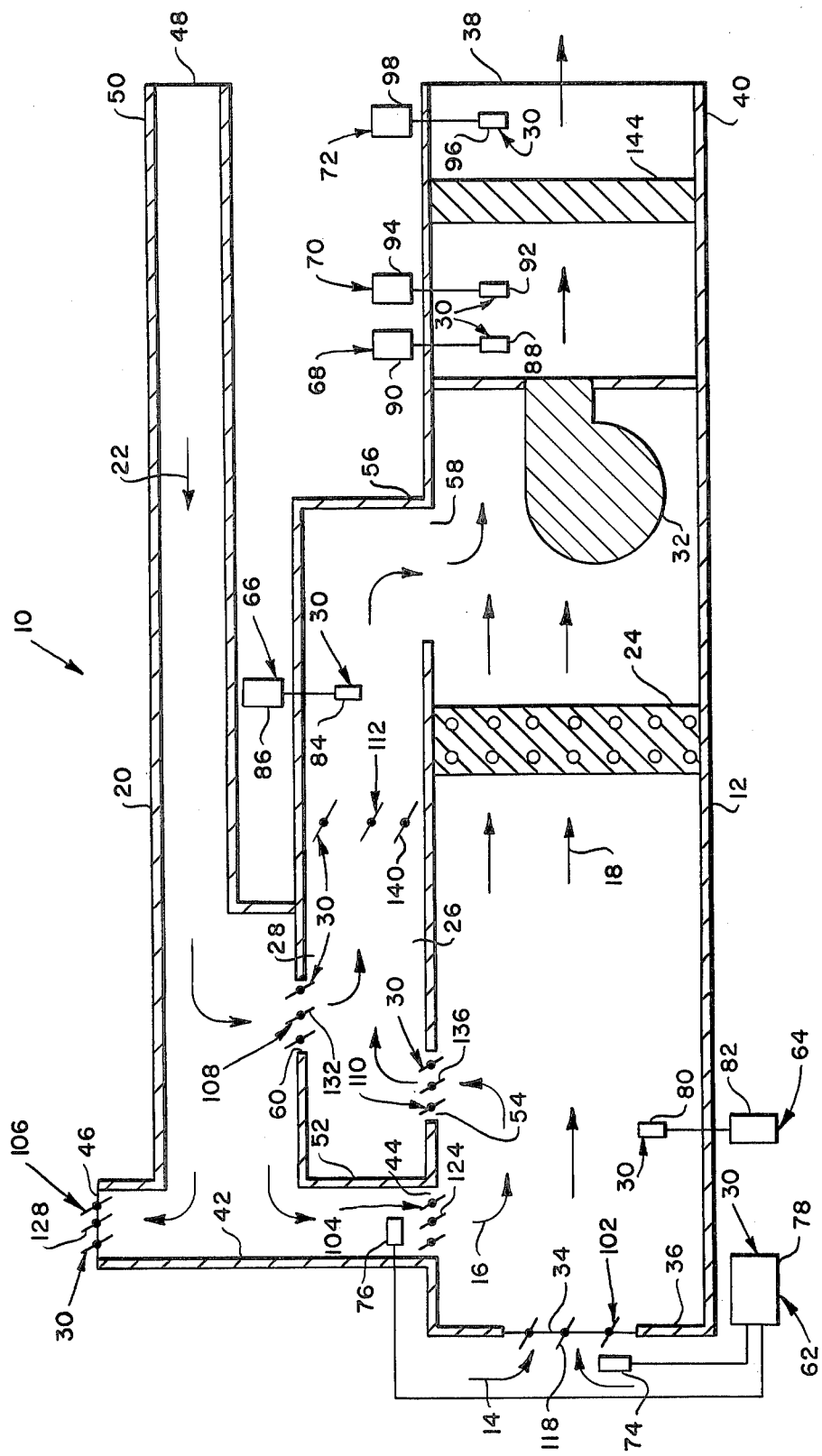
FIG. 1 is a side view in cross section of the apparatus of the present invention.

FIG. 1 illustrates an apparatus, generally designated by numeral 10, for supplying conditioned air at a substantially constant temperature and humidity. Apparatus 10 includes a supply duct 12, coupled to a source of outside supply air, designated by arrow 14 and a source of supply return conditioned air by arrow 16, for carrying the supply air, designated by arrows 18, therethrough. A return duct 20 is coupled to supply duct 12 for carrying return conditioned air, designated by arrow 22, therethrough. A temperature reducing device 24 is coupled to supply duct 12 for decreasing the temperature of the supply and return conditioned air. A by-pass duct 26 is coupled to supply duct 12 for selectively directing portions of the supply and return conditioned air around reducing device 24. Another by-pass duct 28 is coupled to return duct 20 for selectively directing portions of the return conditioned air around the supply duct and the temperature reducing device. Controller devices, generally designated by numeral 30, selectively control the flow and amount of mixing of the supply and return conditioned air flowing through temperature reducing device 24 and within supply duct 12, return duct 20, by-pass duct 26 and another by-pass duct 28 whereby the temperature and humidity of the conditioned air is maintained substantially constant. A circulating mechanism 32 moves the supply air, the return conditioned air, and the conditioned air through the supply duct, the return duct, the by-pass duct, and the another by-pass duct.

More particularly, supply duct 12 is a conduit formed of any type duct material such as sheet metal. Supply duct 12 is part of the air handling apparatus that carries outside air 14, return conditioned air 16 or a mixture of both through temperature reducing device 24. Preferably supply air 18 within supply duct 12 is outside air 14, return conditioned air 16 or a mixture thereof. Supply duct 12 includes an opening 34 at one end 36 where a source of supply air 14 such as outside air can be inputted into the supply duct as supply air 18. Supply duct 12 also includes another opening 38 at the other end 40. The conditioned air is outputted from end 40 to the room to be supplied with conditioned air at a substantially constant temperature and humidity.

The reducing device 24 is preferably within supply duct 12 between ends 36 and 40 so that supply air 18 must pass through the reducing device without escaping around the sides thereof. Preferably, reducing device 24 is a conventional cooling coil through which chilled water or, if desired, a refrigerant flows. Thus, when supply air 18 passes through cooling coil 24 the chilled water or refrigerant will lower the temperature of the supply air.

Return duct 20 is a conduit formed of duct material such as sheet metal. Return duct 20 includes one end 42 connected to supply duct 12 through an opening 44. Opening 44 is preferably between end 36 and cooling coil 24 so that return conditioned air 22 can enter supply duct 12 in front of the cooling coil. End 42 also includes another opening 46 which allows the return conditioned air to be released to the outside. Return duct 20 further includes a third opening 48 at the other end 50 which is connected to the air conditioned room (not shown) and from which the return conditioned air flows into the return duct.

By-pass duct 26 is a conduit formed of duct material such as sheet metal. The by-pass duct includes one end 52 connected to supply duct 12 by an opening 54 between end 36 of supply duct 12 and cooling coil 24. The by-pass duct also includes another end 56 connected to the supply duct by another opening 58 between end 40 of the supply duct and the cooling coil. The by-pass duct allows a portion of the supply air which may be outside air, return conditioned air or a mixture thereof to by-pass the cooling coil and then be mixed with the cooled supply air that has passed through the cooling coil. The by-pass duct allows the conditioned air's temperature to be held substantially constant without the use of energy using reheat devices.

Another by-pass duct 28 is a conduit formed of duct material such as sheet metal. As illustrated in FIG. 1, another by-pass duct 28 is preferably an integral part of by-pass duct 26 and is connected at end 52 to return duct 20 by an opening 60 and consequently end 56 is connected to supply duct 12 by opening 58. Another by-pass duct 28 by-passes cooling coil 24 and supply duct 12 between end 36 of the supply duct and the cooling coil and re-enters the supply duct between the cooling coil and end 40 of the supply duct. The another by-pass duct allows the warm dry return conditioned air to be mixed with the supply air which is cooled by the cooling coil to decrease the humidity of the cooled supply air without having to overcool the supply air and then to reheat it to the desired temperature, thereby realizing great energy savings. Although by-pass duct 26 and another by-pass duct 28 are shown as one integral unit, it should be understood that both ducts 26 and 28 may be separate and distinct, if desired.

Figure 2:
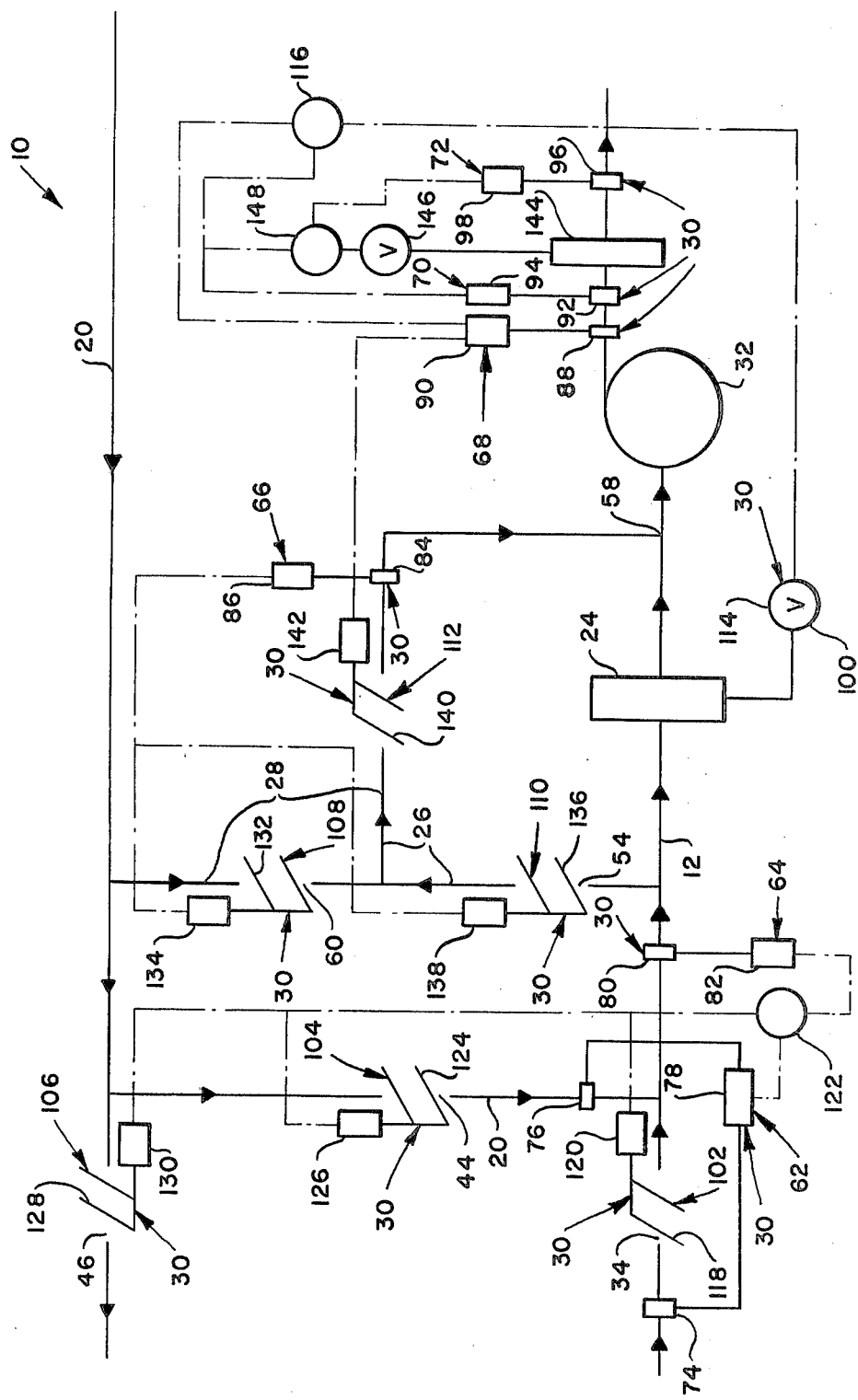
FIG. 2 is a side view schematic of the apparatus of FIG. 1 showing the manner of controlling the temperature and humidity of the conditioned air.

Referring to FIGS. 1 and 2, controller devices 30 include sensing mechanisms, generally designated by numerals 62, 64, 66, 68, 70 and 72, which sense the enthalpy, temperature and humidity of the supply air, the return conditioned air and the conditioned air. Sensing mechanism 62 includes a pair of enthalpy sensors 74 and 76 at openings 34 and 44. These sensors sense the change in enthalpy of the outside air and the return conditioned air. Sensors 74 and 76 are connected to a conventional enthalpy controller 78 for receiving input signals from the sensors. Sensing mechanism 64 includes a temperature sensing bulb 80 in supply duct 12 at end 36. Sensing bulb 80 senses the temperature of the supply air as it enters the supply duct. Sensing bulb 80 is connected to a conventional thermostat 82 which receives temperature information from sensing bulb 80. Sensing mechanism 66 includes a humidity sensing bulb 84 in by-pass duct 26, which also includes another by-pass duct 28 as illustrated in FIG. 1. Sensing bulb 84 senses the humidity of the supply air and the mixture of return conditioned air and supply air that flows through by-pass duct 26. Sensing bulb 84 is connected to a conventional humidistat 86 which receives humidity impulses from sensing bulb 84. Sensing mechanism 68 includes a temperature sensing bulb 88 in supply duct 12 at end 40 preferably between circulating mechanism 32 and opening 38. Sensing bulb 88 senses the temperature of the conditioned air before it enters the room to be conditioned. Sensing bulb 88 is connected to a conventional thermostat 90 which receives temperature signals from sensing bulb 88. Sensing mechanism 70 includes a humidity sensing bulb 92 in supply duct 12 at end 40 preferably between circulating mechanism 32 and opening 38. Sensing bulb 92 senses the humidity of the conditioned air before it enters the room to be conditioned.

Sensing bulb 92 is connected to a conventional humidistat 94 which receives humidity information from sensing bulb 92. Sensing mechanism 72 includes a humidity sensing bulb 96 within supply duct 12 at end 40 preferably between sensing bulb 92 and opening 38. Sensing bulb 96 is connected to a conventional humidistat 98 which receives humidity impulses from sensing bulb 96. The function of sensing mechanism 72 will be later described.

Controller devices 30 further include responsive mechanisms, generally designated by numerals 100, 102, 104, 106, 108, 110 and 112 which regulate the flow and mixing of the supply air, and the return conditioned air. Responsive mechanism 100 is preferably a conventional valve 114 which is connected to cooling coil 24 and to sensing mechanisms 68 and 70 through a conventional high or low pressure selector 116. In response to a temperature or humidity change sensed by sensing bulbs 88 or 92, respectively, thermostat 90 or humidistat 94 will selectively open or close valve 114 to regulate the amount of cooling fluid flowing through cooling coil 24.

The interconnection between the various sensing mechanisms and responsive mechanisms for proper control thereof is illustrated by the interconnecting phantom lines shown in FIG. 2.

Responsive mechanism 102 includes a damper 118 within opening 34 of supply duct 12 and a conventional motor 120 for opening and closing damper 118. Motor 120 is connected to sensing mechanisms 62 and 64 through a high or low pressure selector 122. When a preselected enthalpy or temperature is sensed by enthalpy sensors 74 and 76 or by sensing bulb 80, controller 78 or thermostat 82 activate motor 120 which opens or closes damper 118 regulating the amount of outside air flowing into supply duct 12. Responsive mechanism 104 includes a damper 124 within opening 44 of return duct 20 and a conventional motor 126 for opening and closing damper 124. Motor 126 is connected to sensing mechanisms 62 and 64 through pressure selector 122. In response to enthalpy and temperature changes sensed by sensors 74 and 76 or sensing bulb 80, controller 78 or thermostat 82 activate motor 126 which opens or closes damper 124 regulating the amount of return conditioned air which flows into the supply duct from the return duct. Responsive mechanism 106 includes a damper 128 within opening 46 of return duct 20 and a conventional motor 130 for opening and closing damper 128. Motor 130 is connected to sensing mechanisms 62 and 64 through pressure selector 122. In response to enthalpy and temperature changes sensed by sensors 74 and 76 or sensing bulb 80, controller 78 or thermostat 82 activate motor 130 which opens or closes damper 124 regulating the amount of return conditioned air to be evacuated to the outside.

Responsive mechanism 108 includes a damper 132 within opening 60 between another by-pass duct 28 and return duct 20 and a conventional motor 134 for opening and closing damper 132. Motor 134 is connected to sensing mechanism 66 and when a preselected humidity is sensed by sensing bulb 84 humidistat 86 activates motor 134 to open or close damper 132 which regulates the amount of return conditioned air that enters another by-pass duct 28. Responsive mechanism 110 includes a damper 136 within opening 54 between by-pass duct 26 and supply duct 12 and a conventional motor 138 for opening and closing damper 136. Motor 138 is connected to sensing mechanism 66 and when a preselected humidity is sensed by sensing bulb 84, humidistat 86 activates motor 138 to open or close damper 136 which regulates the flow of supply air or a mixture of supply air and return conditioned air that enters by-pass duct 26.

Responsive mechanism 112 includes a damper 140 within by-pass duct 26 between openings 54 and 58 and a conventional motor 142 for opening and closing damper 140. Motor 142 is connected to sensing mechanism 68 and when a preselected temperature is sensed by sensing bulb 88, thermostat 90 activates motor 142 to open or close damper 140 which regulates the amount of supply air flowing within by-pass duct 26.

Preferably, apparatus 10 includes a humidifier 144 within supply duct 12 between circulating fan 32 and end 40. It is also preferred that humidifier 144 be between sensing mechanisms 70 and 72. Humidifier 144 is connected to a conventional valve 146 which regulates the flow of steam or the flow of water to a spraying device (not shown) into humidifier 144. Humidistat 94 and 98 of sensing mechanisms 70 and 72, respectively, are connected to a high or low pressure selector 148 which is connected to valve 146. When the conditioned air flowing through opening 38 is below the desired humidity level, sensing bulb 92 senses the humidity and humidistat 94 activates valve 146 to allow steam or water to flow into humidifier 144. Thus, the humidity of the conditioned air is increased when the conditioned air flows through the humidifier. Should the humidity of the conditioned air exceed a desired level, sensing bulb 96 senses the humidity and humidistat 98 will override humidistat 94 and close valve 146.

In the operation of apparatus 10, there are four distinct operating conditions that are encountered when using outside air as a source of supply air for supplying conditioned air to a room at a desired temperature and humidity. The first operating condition is when the outside air temperature and humdity are below the desired dew point of air to be supplied to the air conditioned room. The second condition is when the outside air humidity is below the desired dew point and the temperature is at the low end between the desired dew point and the enthalpy changeover; enthalpy changeover is that point where the enthalpy of the outside air equals the enthalpy of the return conditioned air. The third condition is when the outside air humidity is above the desired dew point and the temperature is at the high end between the desired dew point and the enthalpy changeover. The fourth condition is when the enthalpy of the outside air is higher than the enthalpy of the return conditioned air. For illustration purposes only, it is to be assumed that the dew point of the conditioned air is to be 55 degrees Fahrenheit, that the low end temperature is between 55 and 60 degrees Fahrenheit, that the high end temperature is between 60 degrees Fahrenheit and enthalpy changeover, and that the conditioned air be supplied at about 60 degrees Fahrenheit. With conditioned air supplied at these conditions it has been found that the return conditioned air will have a higher temperature and lower humidity, depending on the make up of the conditioned room. It should also be understood that sensing mechanisms 62, 64, 66, 68, 70 and 72 are preset at desired temperature and humidity settings in order that the conditioned air be supplied at 60 degrees Fahrenheit and at a dew point of 55 degrees Fahrenheit, for example. Further, all settings on the sensing mechanisms should take into account that as the supply air passes through circulating fan 32 the temperature of the supply air will be increased between 1 and 2 degrees Fahrenheit.

In the first condition the outside air temperature and humidity are below the dew point of 55 degrees Fahrenheit. Sensing bulb 80 of sensing mechanism 64 senses the temperature and thermostat 82 signals motors 120, 126, and 130 to regulate the opening of dampers 118, 124, and 128, respectively. Thus, outside air which is below 55 degrees Fahrenheit flows through opening 34 into supply duct 12 and return conditioned air at a temperature higher than 55 degrees Fahrenheit flows through opening 44 into supply duct 12 where it mixes with the outside air. Further, the return conditioned air flows through opening 46 to the outside. Sensing mechanism 64 continually monitors the temperature of the mixed supply air and when the temperature reaches a desired level thermostat 82 activates motor 126 partially closing damper 124 and activates motor 130 to more fully open damper 128 thereby supplying less hotter conditioned air to the supply duct for mixing with the outside air and allowing more of the return conditioned air to escape to the outside. Should the temperature fall below a specified level damper 124 is more fully opened and damper 128 is more fully closed to supply more heated return conditioned air to the supply duct for mixing with the outside air and to supply less return conditioned air to the outside. Thus, by regulating dampers 124 and 128 by thermostat 82 the conditioned air flowing through opening 38 will be maintained substantially constant at 60 degrees Fahrenheit.

Sensing mechanism 68 senses the temperature of the supply air when it comes from circulating fan 32 and because the supply air will be at the desired temperature thermostat 90 maintains cooling coil 24 in the off condition and activates motor 142 to partially or fully open damper 140 so that the supply air can flow past sensing bulb 84 of sensing mechanism 66. When the dew point is below 55 degrees Fahrenheit the humidity of the supply air will be below the humidity setting of humidistat 86 of sensing mechanism 66. This causes humidistat 86 to activate motor 138 to fully or partially open damper 136 allowing supply air to pass into by-pass duct 26 and past sensing bulb 84 and to activate motor 134 to fully close damper 132 to prevent any return conditioned air to flow into another by-pass duct 28. As the supply air flows past sensing bulb 92, the humidity is monitored by humidistat 94 of sensing mechanism 70. Should the humidity of the supply air fall below the desired setting of humidistat 94, humidistat 94 opens valve 146 activating humidifier 144 which puts the desired moisture into the supply air. Sensing mechanism 72 is used as a safety device to ensure that the humidity of the conditioned air does not exceed a specified value that may be detrimental to equipment contained in the air conditioned room such as sensitive electrical equipment like computers. When the humidity of the supply air exceeds the setting on humidistat 98, humidistat 98 overrides sensing mechanism 70 through pressure selector 148 and closes valve 146 deactivating humidifier 144.

In the second condition the outside air is between 55 and 60 degrees Fahrenheit and the humidity is below the dew point. Bulb 80 of sensing mechanism 64 senses the temperature of the supply air and thermostat 82 activates motor 120 to fully open damper 118 to allow the outside air to enter supply duct 12, activates motor 126 to fully close damper 124 to prevent the hotter return conditioned air from entering the supply duct, and activates motor 130 to fully open damper 128 to permit the return conditioned air to escape to the outside. Because the outside temperature is at approximately the desired conditioned air temperature of 60 degrees Fahrenheit, cooling coil 24 is not activated by sensing mechanism 68 and thermostat 86 of sensing mechanism 66 activates motor 142 to open damper 140 in by-pass duct 26. Because the humidity of the outside air is below the dew point bulb 84 of sensing mechanism 66 senses the condition and humidistat 86 activates motor 134 to fully close damper 132 to prevent the less humid return conditioned air from entering another by-pass duct 28 and activates motor 138 to open damper 136 to allow the outside supply air to flow through the by-pass duct and pass humidity sensing bulb 84. Should the humidity of the outside air drop below the desired level for the conditioned air, bulb 92 of sensing mechanism 70 senses the condition as the supply air exits from circulating fan 32 and humidistat 94 activates valve 146 which allows steam or water to flow into humidifier 144. As the supply air flows through the humidifier the steam or water vapor increases the humidity of the supply air to the desired level. Should the humidity of the conditioned air reach a harmful level, bulb 96 of sensing mechanism 72 senses the condition and humidistat 98 overrides humidistat 94 through pressure selector 148 and closes valve 146 which deactivates the humidifier.

In these first two conditions the energy savings are great. By using outside air that is below the temperature of the conditioned air, cooling coil 24 does not have to be activated for cooling the supply air. Further, because the humidity is below the dew point level the cooling coil does not have to be activated to overcool the supply air to reduce the humidity level of the supply air. Reheating equipment is not needed and reheating energy is not expended because the hotter return conditioned air is mixed with the cool outside air to increase the temperature of the supply air to the desired temperature of the conditioned air.

In the third condition the temperature of the outside air is between 60 degrees Fahrenheit and enthalpy changeover and the humidity of the outside air is above the dew point. Sensing bulb 80 of sensing mechanism 64 senses the temperature of the supply air and thermostat 82 activates motor 120 to fully open damper 118 to allow the outside air to flow into supply duct 12, activates motor 126 to fully close damper 124 to prevent the return conditioned air from entering the supply duct, and activates motor 130 to fully open damper 128 to allow the return conditioned air to escape to the outside.

Sensing bulb 88 of sensing mechanism 68 senses the temperature of the supply air from circulating fan 32 and thermostat 90 activates motor 142 to close damper 140 to prevent the supply air from passing through by-pass duct 26. Bulb 84 of sensing mechanism 66 senses the low humidity level within the by-pass duct because no supply air can pass therethrough and activates motor 136 to fully open damper 138 and activates motor 134 to fully close damper 132.

When the relatively warm supply air passes bulb 88 of sensing mechanism 68, thermostat 90 activates valve 114 to allow the desired amount of coolant to flow into cooling coil 24. As the supply air passes through the cooling coil the temperature is decreased to the desired level and moisture is removed from the supply air to the desired humidity level. Upon a further decrease in temperature below the desired level, sensing bulb 88 senses the condition and thermostat 90 activates motor 142 to open damper 140 to allow some of the supply air to flow through by-pass duct 26 thereby by-passing cooling coil 24. The warmer supply air by-passing the cooling coil re-enters the supply duct through opening 58 and mixes with the supply air from the cooling coil to increase the temperature of the conditioned air to the desired level. Thermostat 90 of sensing mechanism 68 regulates damper 140 to ensure the correct amount of supply air flows through by-pass duct 12 to maintain the conditioned air at the correct temperature.

Sensing bulb 84 of sensing mechanism 66 senses the humidity of the supply air flowing through by-pass duct 26. When the humidity of the supply air exceeds a preselected level, humidistat 86 activates motor 138 to partially close damper 136 and activates motor 134 to partially open damper 132. Consequently less supply air enters the by-pass duct and the warmer and less humid return conditioned air enters another by-pass duct 28. The supply air and the return conditioned air mix which reduces the humidity of the air flowing through opening 58. When the less humid air mixes with the supply air coming from the cooling coil the humidity of the conditioned air will also be reduced. Humidistat 86 continually regulates the opening and closing of dampers 132 and 136 to ensure that the humidity of the conditioned air remains substantially constant at the desired level. Should the humidity of the conditioned air still be above the desired level even when damper 136 is fully closed and damper 132 fully open, which only allows the return conditioned air to by-pass the cooling coil and mix with all the supply air flowing through the cooling coil, sensing bulb 92 of sensing mechanism 70 senses the condition and humidistat 94 overrides thermostat 90 through pressure selector 116 and activates valve 114 to allow more coolant to flow into the cooling coil. Thus, the supply air is further cooled which removes more moisture from the supply air and consequently decreases the humidity of the conditioned air.

In the third condition the energy saved is extensive. By using outside air as the supply air rather than recirculated air, cooling coil 24 does not have to expend as great an amount of energy to cool the supply air because the supply is at a cooler temperature than the recirculated air. By-pass duct 26 allows the warmer supply air to mix with the cooled supply air to reheat the conditioned air to the correct temperature rather than utilizing expensive reheat equipment that requires energy to operate. Another by-pass duct 28 allows the relative less humid return conditioned air to be mixed with the cooled supply air to reduce the humidity of the conditioned air without having to expend additional energy in the cooling coil to overcool the supply air to remove unwanted humidity. And when additional cooling by the cooling coil is needed to reduce humidity, the amount of energy needed is less because of the additional use of the return conditioned air through the another by-pass duct.

In the fourth condition, the outside air temperature is above the enthalpy change over point. Enthalpy sensor 74 senses the enthalpy of the outside air and enthalpy sensor 76 senses the enthalpy of the return conditioned air in return duct 20. When the enthalpy sensed by sensor 74 is greater than the enthalpy sensed by sensor 76, enthalpy controller 78 overrides sensing mechanism 64 through pressure selector 122 and activates motor 120 to fully close damper 118 to prevent the outside air to enter supply duct 12, activates motor 126 to fully open damper 124 to allow the return conditioned air to enter the supply duct, and activates motor 130 to fully close damper 128 to prevent the return conditioned air from escaping to the outside.

Sensing bulb 88 of sensing mechanism 68 senses the temperature of the supplied return conditioned air from circulating fan 32 and thermostat 90 activates motor 142 to close damper 140 to prevent the return conditioned air from passing through by-pass duct 26. Bulb 84 of sensing mechanism 66 senses the low humidity level within the by-pass duct because no return conditioned air can pass therethrough and humidistat 86 activates motor 138 to fully open damper 136 and activates motor 134 to fully close damper 132.

When the warm return conditioned air passes bulb 88 of sensing mechanism 68, thermostat 90 activates valve 114 to allow the desired amount of coolant to flow into cooling coil 24. As the return conditioned air passes through the cooling coil the temperature is decreased to the desired level and moisture is removed from the return conditioned air to the desired humidity level. Upon further decrease in temperature below the desired level, sensing bulb 88 senses the condition and thermostat 90 activates motor 142 to open damper 140 to allow some of the return conditioned air to flow through by-pass duct 26 thereby by-passing the cooling coil. The warmer return conditioned air is mixed with the cooler air from the cooling coil to bring the temperature up to the desired level. Thermostat 90 regulates damper 140 to ensure the correct amount of return conditioned air flows through by-pass duct 26 to maintain the conditioned air at the correct temperature. Should the humidity of the conditioned air rise above the desired level, sensing bulb 92 senses the condition and humidistat 94 overrides thermostat 90 through pressure selector 116 and activates valve 114 to increase the coolant flow to cooling coil 24 which reduces the temperature of the return conditioned air flowing through the cooling coil causing more moisture to be removed. The temperature of the conditioned air is increased to the desired level by allowing more return conditioned air to flow through the by-pass duct.

The fourth condition also saves energy because the return conditioned air is used to bring the overcooled conditioned air up to the desired temperature rather than using expensive and energy consuming reheat equipment.

An apparatus for supplying conditioned air at a substantially constant temperature and humidity has been disclosed. Obvious modifications and variations of the apparatus are possible in light of the above teachings. It is to be understood, therefore, that within the scope of the appended claims the apparatus may be practiced otherwise than as specifically described and illustrated.

Accordingly, the invention having been described in its best embodiment and mode of operation, that which is desired to be claimed by Letters Patent is:

1. Apparatus for supplying conditioned air at a substantially constant temperature and humidity comprising:
   supply duct means coupled to a source of supply air for carrying said supply air therethrough;
   return duct means coupled to said supply duct means for carrying return conditioned air therethrough;
   means for reducing the temperature of said supply and said return conditioned air;

by-pass duct means coupled to said supply duct means for selectively directing portions of said supply and said return conditioned air around said reducing means;

another by-pass duct means coupled to said return duct means for selectively directing portions of said return conditioned air around said supply duct means and said reducing means;

first thermostat means within said supply duct means for sensing the temperature of said supply air;

first damper means coupled to said first thermostat means for regulating the flow of said return conditioned air to the outside of said apparatus;

second damper means coupled to said first thermostat means for regulating the flow of said return conditioned air into said supply duct means;

third damper means coupled to said first thermostat means for regulating the flow of outside air into the supply duct means;

humidistat means within said by-pass duct means for sensing the humidity of said supply air and said return conditioned air;

fourth damper means coupled to said humidistat means for regulating the flow of said return conditioned air within said another by-pass duct means;

fifth damper means coupled to said humidistat means for regulating the flow of said supply air and said return conditioned air within said by-pass duct means;

second thermostat means within said supply duct means for sensing the temperature of said conditioned air;

sixth damper means coupled to said second thermostat means for regulating the flow of the supply air and said return conditioned air within said by-pass duct means; and means for moving said supply air, said return conditioned air and said conditioned air through said supply duct means, said return duct means, said by-pass duct means, and said another by-pass duct means.

2. The apparatus of claim 1 wherein said supply air is inputted at one end of said supply duct means and said conditioned air is outputted at another end of said supply duct means.

3. The apparatus of claim 2 wherein said reducing means is within said supply duct means between said one end and said another end.

4. The apparatus of claim 3 wherein said return duct means includes one end being coupled to said supply duct means between said one end of said supply duct means and said reducing means.

5. The apparatus of claim 4 wherein one portion of said one end of said return duct means is coupled to the outside of said apparatus.

6. The apparatus of claim 5 wherein said by-pass duct means has one end coupled to said supply duct means between said one end of said supply duct means and said reducing means and another end coupled to said supply duct means between said reducing means and said another end of said supply duct means.

7. The apparatus of claim 6 wherein said another by-pass duct means has one end coupled to said return duct means and another end coupled to said supply duct means between said reducing means and said another end of said supply duct means.

8. The apparatus of claim 7 wherein said moving means includes a fan within said supply duct means between said reducing means and said another end of said supply duct means.

9. The apparatus of claim 7 further including another humidistat means within said supply duct means for sensing the humidity of said conditioned air.

10. The apparatus of claim 9 wherein:
said first thermostat means is at said one end of said supply duct means;
said second thermostat means is between said reducing means and said other end of said supply duct means; and
said another humidistat means is between said reducing means and said another end of said supply duct means.

11. The apparatus of claim 10 further including valve means selectively responsive to said second thermostat means and said other humidistat means for causing coolant to flow within said reducing means when the temperature and humidity of said conditioned air reaches a preselected condition.

12. The apparatus of claim 1 further including:
enthalpy sensor means responsive to the enthalpy of said source of said supply air; and
enthalpy controller means responsive to said enthalpy sensor means and coupled to said first, second, and third damper means for selectively controlling the flow of said supply air and said return conditioned air in response to enthalpy changes of said supply air.

13. The apparatus of claim 11 further including humidifier means within said supply duct means between said reducing means and said another end of said supply duct means for selectively increasing the humidity of said conditioned air.

14. The apparatus of claim 13 further including another valve means responsive to said other humidistat means and coupled to said humidifier means for selectively controlling humidity output of said humidifier means.

15. The apparatus of claim 14 further including a third humidistat means responsive to the humidity of said conditioned air and coupled to said another valve means for overriding said other humidistat means when the humidity of said conditioned air reaches a preselected condition.

* * * * *